Feb. 14, 1950      W. F. SCHACHT      2,497,632
CATTLE MARKER
Filed July 8, 1946      3 Sheets-Sheet 1
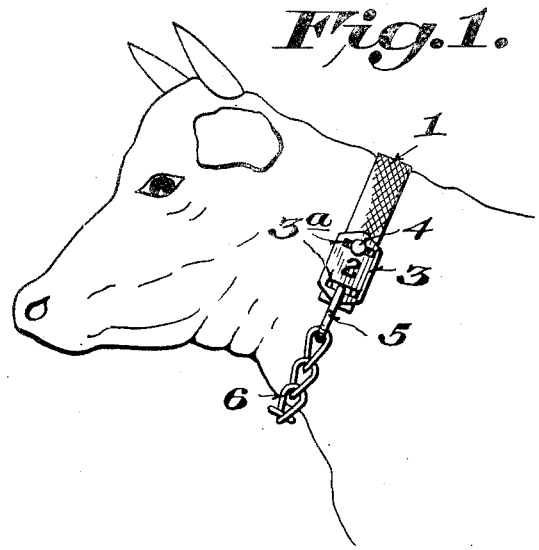
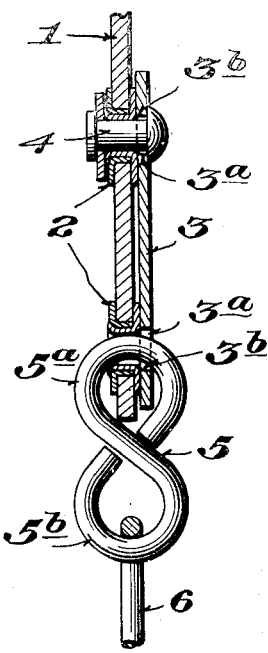
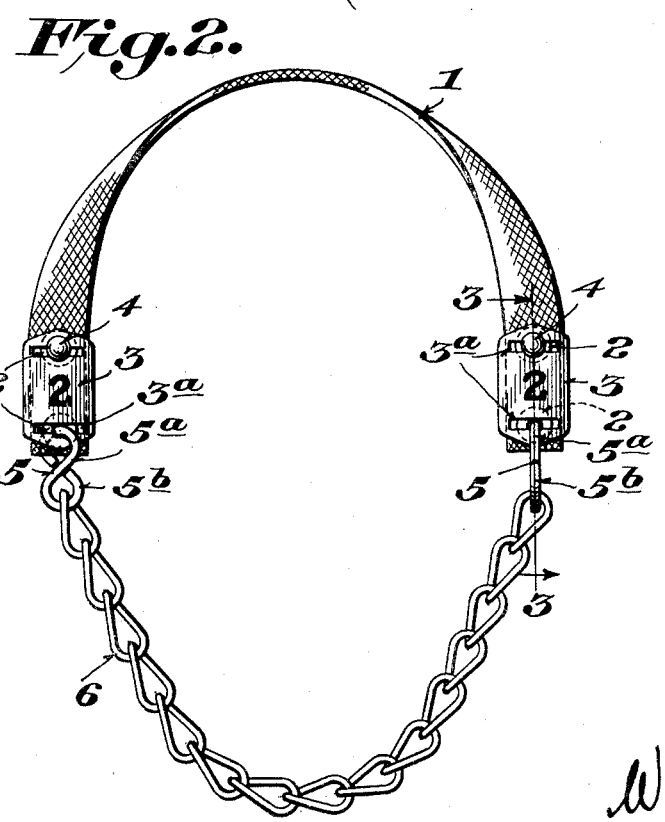
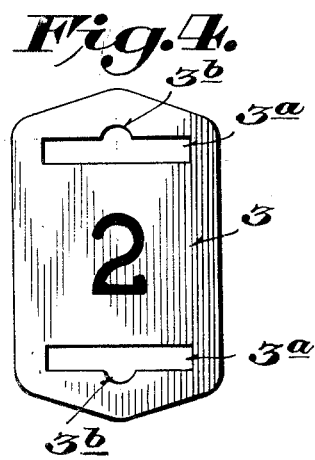

Feb. 14, 1950 W. F. SCHACHT 2,497,632
CATTLE MARKER
Filed July 8, 1946 3 Sheets-Sheet 2
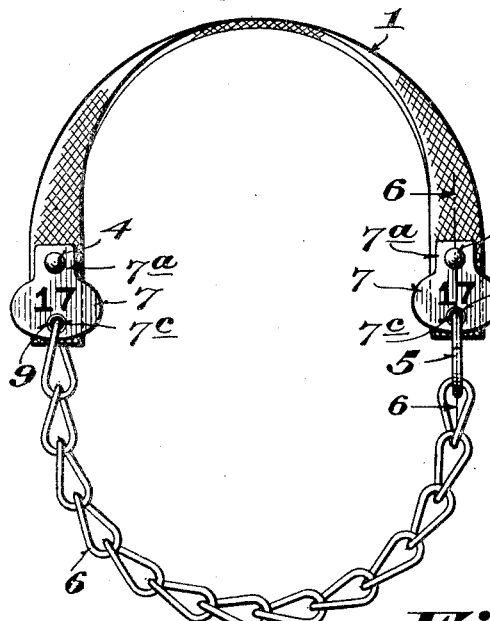
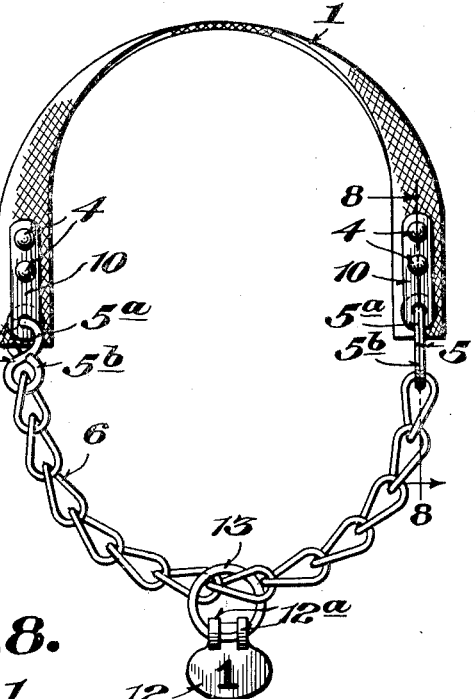
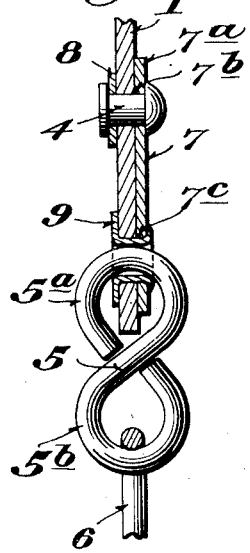
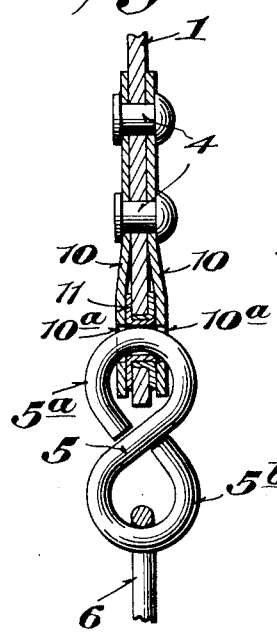
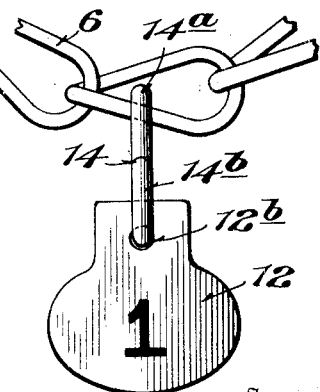

Feb. 14, 1950 W. F. SCHACHT 2,497,632
CATTLE MARKER
Filed July 8, 1946 3 Sheets-Sheet 3
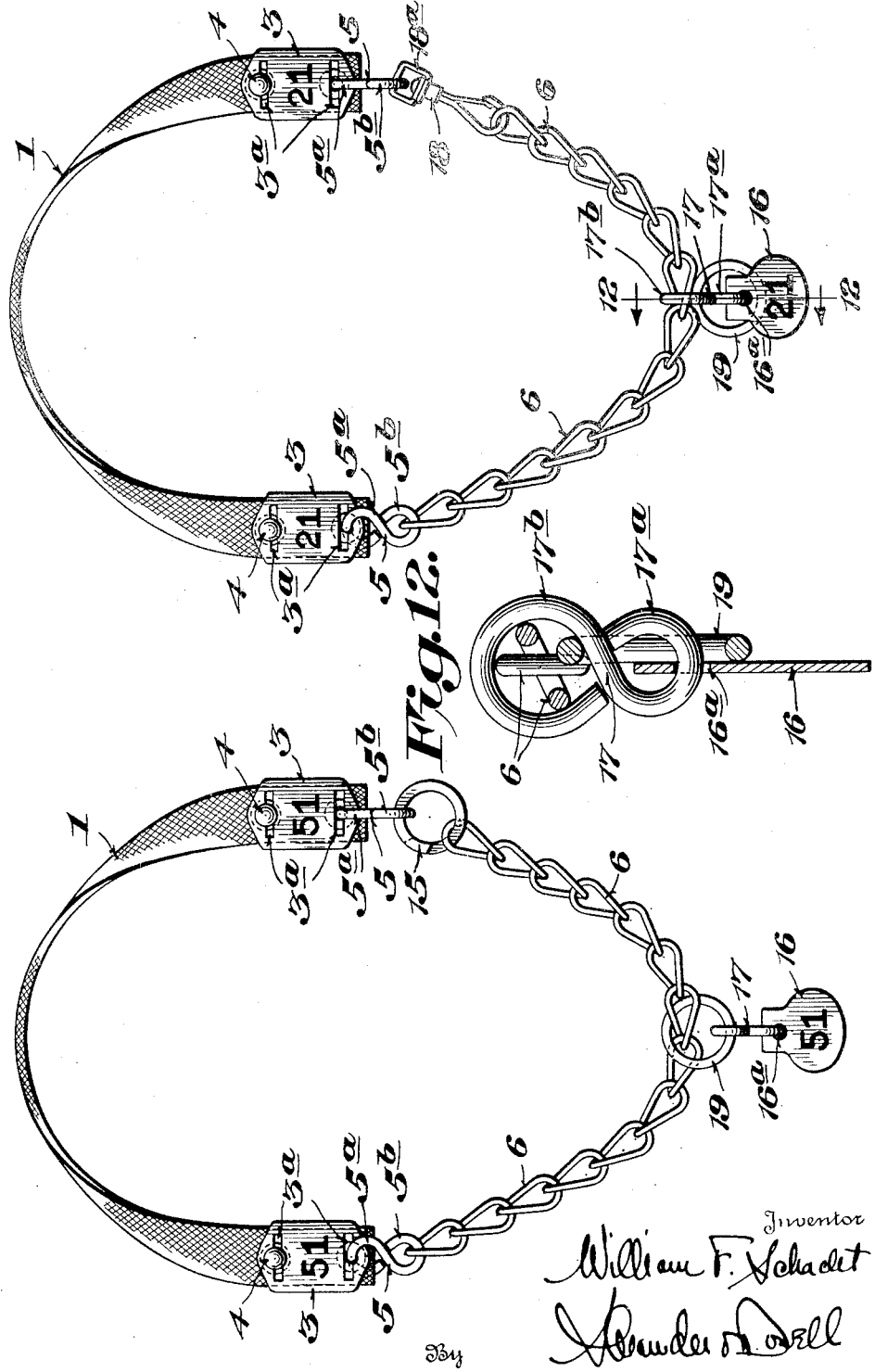

Patented Feb. 14, 1950

2,497,632

UNITED STATES PATENT OFFICE 2,497,632

CATTLE MARKER

William F. Schacht, Huntington, Ind.; William J. Schacht, executor of said William F. Schacht, deceased, assignor to William F. Schacht, II, and Robert W. Schacht, both of Huntington, Ind.

Application July 8, 1946, Serial No. 681,828

2 Claims. (Cl. 40—3)

This invention is a novel improvement in cattle markers adapted to encircle the neck of livestock, said marker carrying one or more marker plates disposed at each side of the neck of the livestock, whereby farmers and herdsmen may readily identify same, the present invention being an improvement upon my cattle markers shown in my U. S. Letters Patent Nos. 2,327,823, dated August 24, 1943; 2,327,824, dated August 24, 1943; 2,345,292, dated March 28, 1944; 2,345,293, dated March 28, 1944; and 2,383,419, dated August 21, 1945; also an improvement upon the cattle markers shown in my copending application Serial No. 615,871, filed September 12, 1945, now abandoned, and shown in my copending applications Serial Nos. 616,901 and 616,902, filed September 17, 1945, now abandoned.

I will explain the invention with reference to the accompanying drawings, which illustrate several practical embodiments thereof, to enable others to adopt and use the same; and will summarize in the claims, the novel features of construction, and novel combinations of parts, for which protection is desired.

In said drawings:

Figure 1 is a side view showing a cow's neck provided with one embodiment of my novel cattle marker.

Fig. 2 is a plan view of the marker, detached.

Fig. 3 is an enlarged section on the line 3—3, Fig. 2.

Fig. 4 is a plan view of the marker plate, detached.

Fig. 5 is a plan view showing a modified embodiment.

Fig. 6 is an enlarged vertical section on the line 6—6, Fig. 5.

Fig. 7 is a plan view showing a further modified embodiment.

Fig. 8 is an enlarged section on the line 8—8, Fig. 7.

Fig. 9 is a detail plan view of a modification of the means for suspending the marker plate shown in Fig. 7.

Fig. 10 is a plan view of a further modified embodiment.

Fig. 11 is a plan view of a still further modified embodiment.

Fig. 12 is a vertical section on the line 12—12, Fig. 11.

In the embodiment shown in Figs. 1 to 4, the cattle marker comprises a pliable strap 1 of leather or woven fabric or canvas, chemically treated, or molded from rubber and canvas or fabric, or any suitable flexible material that will withstand water and has sufficient inherent strength to prevent rupture, said strap being flat and of substantial width.

Strap 1 is of such length that its ends terminate at the sides of the neck of the livestock, and adjacent each end of the strap are spaced eyelets 2 of metal adapted to secure the marker plates 3 to strap 1, said marker plates being shown more particularly in Fig. 4, same being substantially rectangular in shape and bearing indicia such as "2" or any other distinguishing mark, whereby the livestock may be readily identified, said indicia being preferably affixed to plate 3 by engraving, stamping, die-cutting or otherwise, so as to appear permanently thereon.

Adjacent the upper and lower ends of each plate 3 are elongated transverse slots 3a which are relatively narrow and are provided with semicircular recesses 3b in their outer walls at the center of the plate for the purpose hereinafter set forth, the slots 3a and their recesses 3b being spaced the same distance apart as the eyelets 2 in the strap 1.

As shown in Fig. 3, a rivet 4 is passed through the upper eyelet 2 and through the upper slot 3a—3b in the related plate 3, while the upper eye 5a of a double hook 5 is passed through the lower eyelet 2 and through the lower slots 3a—3b of plate 3 to securely lock plate 3 to strap 1, the rivet 4 and the eye 5a filling the semi-circular recesses 3b of the slots 3a so as to maintain each plate 3 centered on the strap.

In the lower eye 5b of one double hook 5 is secured the end of a chain 6 of any desired type, the eye 5b being closed upon the chain 6, while the lower eye 5b of the other double hook 5 is initially left open so that the farmer or herdsman may engage the open eye with a link adjacent the other end of chain 6 when placing and adjusting the cattle marker on the neck of the livestock, the open eye 5b being subsequently closed after the proper link of chain 6 is engaged therewith.

The strap 1 of leather or fabric or other flexible material prevents the possibility of sore spots developing at the top of the neck of the livestock, as has been found to be the case when using chains which pass over the top of the neck and which chains shift upon each movement of the head of the livestock.

Moreover, the strap 1 has a tendency to stay in place, the same becoming more or less embedded in the hair on the top and sides of the neck of the livestock and thus being substantially anchored on the cow's neck, preventing the marker from rotating axially on the head, and thus maintaining the marker plates in their proper position at the sides of the cow's neck. The use of the section of strap, at the same time, also materially reduces the amount of chain necessary in forming the marker and thereby reduces manufacturing costs, which reduction can be passed on to the herdsman or farmer.

The marker would be placed on the cow's neck with the open end 5b of one double hook 5 disengaged from the chain 6, then the chain brought up under the cow's neck and looped in the open eye 5b and the open eye then closed. The chain may thus be adjusted to fit the neck of either a cow or a calf, which neck circumferences vary greatly in size. When applied to a calf, there would be some extra chain which the herdsman may not like to cut off, therefore the chain might be left hanging down, or may have its end brought up and engaged in the eye 5b of the hook 5. As the calf grows older, the eye 5b of the double hook may be opened and the chain let out to its desired length to increase its circumference. The extra length of chain looped in the eye of the double hook forms a ready handle or loop whereby the calf may be tied up.

By the above construction, each marker plate 3 has a double lock on the strap 1 since the upper portion is secured by the rivet 4 and the lower portion secured by the upper eye 5a of the double hook 5 and thus it is practically impossible that the marker plate 3 will become disengaged or detached from the strap 1. The provision, moreover, of the slots 3a enhance the appearance of the marker.

In the modification shown in Figs. 5 and 6, a somewhat similar construction is shown in which identical parts are similarly numbered. In this modification the upper eyelets 2 in the strap 1, as shown in Figs. 1 to 4, are eliminated in Figs. 5 and 6 and the marker plate 7 carries indicia such as "17" and is provided with a central shank 7a at the upper end which is perforated as at 7b at the center thereof, while the body of the plate 7 adjacent its lower end is provided with a perforation 7c disposed vertically below the perforation 7b.

In this modification the rivet 4 is passed directly through an upper perforation in the strap 1, a washer 8 being introduced between the rivet head and the back of the strap 1 to prevent enlargement of the perforation in the strap. At one plate 7 the end of chain 6 is engaged in an eyelet 9 in strap 1 and in perforation 7c of plate 7, while the upper eye 5a of a double hook 5 is passed through an eyelet 9 in strap 1 and through the perforation 7c of the other plate 7, as shown in Fig. 6. The lower eye 5b of hook 5 is initially left open so that the herdsman may insert a link adjacent the free end of chain 6 in said open eye 5b before closing, thus enabling the herdsman to readily apply and adjust the marker on the livestock.

In the modification shown in Figs. 7 and 8 the parts are generally similar and identical parts are similarly numbered. In this modification a pair of metal strips 10 are secured by a pair of rivets 4 to the inner and outer faces of the strap 1, at the ends thereof, said rivets 4 passing through perforations in the plates 10 adjacent their upper ends. Adjacent the respective ends of the strap are eyelets 11 registering with holes 10a in the strips 10, and the upper eyes 5a of double hook 5 are passed through the eyelets 11 and through the holes 10a in plates 10. One end of the chain 6 is secured in the lower eye 5b of one double hook 5, while the lower eye 5b of the other hook would initially be left open, the same being closed after the marker is applied and adjusted to the neck of the livestock.

In this modification the indicia on the outer plates 10 may be omitted and the indicia carried on a marker plate 12, having eyes 12a formed on a shank at the upper end of the plate 1, and a ring 13 (solid, split or key) secured in the eyes 12a, the chain 6 being passed through the ring 13. By the above construction, as the ring 13 is loosely suspended on the chain 6 the plate 12 will always remain centered by gravity at the under side of the cow's neck, and the indicia on the plate 12 may be displayed on both sides thereof and would be readable from positions at both sides of the cow.

Instead of utilizing the ring 13 for suspending the plate 12 (Fig. 7) from the chain 6, the plate may be secured by means of a double hook 14 (Fig. 9) having its upper eye 14a locked into one of the links of chain 6 below the cow's neck, and the lower eye 14b of the hook 14 engaged in a perforation 12b in the shank of the marker plate 12. By this construction the indicia on the plate 12 would be visible only from a position in front of the cow.

In the modification shown in Fig. 10, the parts are generally similar to the construction shown in Figs. 1 to 4 and identical parts are similarly numbered. In this modification a coiled key ring 15 is carried by the lower eye 5b of one double hook 5, and a link adjacent the outer end of chain 6 may be readily secured in the key ring 15 without necessitating the herdsman or farmer opening and closing the eye of either double hook 5 when applying or adjusting the marker to the livestock; thus rendering the marker more readily adjustable to variations in the circumference of the neck of the livestock.

In addition to the marker plates 3 on the sides of the marker, an additional marker plate 16 may be suspended from the chain 6 by means of a double hook 17 having its lower eye passed through a hole 16a in the shank of the marker plate 16, and its upper eye engaging a coiled key ring or a solid ring 19 through which the chain 6 is passed, the marker plate 16 bearing the same indicia as the plates 3. As ring 19 is slidable on the chain 6, the plate 16 will by gravitation remain suspended below the cow's neck at all times.

In the modification shown in Figs. 11 and 12 the parts are generally similar to the marker shown in Figs. 2 and 10 and identical parts are similarly numbered. In this modification, in place of the coiled key ring 15 shown in Fig. 5, I provide a snap 18 having an eye 18a engaged in the lower eye 5b of one double hook 5, a link adjacent the outer end of chain 6 being engaged with the snap. Obviously, this form of construction also permits ready changing of the circumference of the marker without necessitating opening and closing of the eyes of either double hook 5. In this modification the supplemental marker plate 16 may also be utilized, same bearing the same indicia as the marker plates 3, the plate 16 being engaged with the lower eye 17a of the double hook 17, while the upper eye 17b is passed around the chain 6 at a point under the neck of the cow, said eye 17b also supporting the ring 19 which is normally disposed in rear of the supplemental marker plate 16, which ring is adapted to receive the snap of a halter strap (not shown) whereby the livestock may be tied in stalls or other places, and whereby the marker may serve in place of the usual leather or other expensive halter for the livestock, as disclosed in my aforesaid Letters Patent No. 2,383,419 and others above referred to. The type of marker using the snap 18 shown in Figs. 11 and 12 would be particularly desirable for use on young livestock.

In connection with the supplemental marker plates 12 and 16 as shown in Figs. 7 and 10, it is noted that the rings 13 and 19 (solid, split or key) are freely movable on the chain 6, so that if the cow strikes an object the marker plates 12 and 16 and their connecting rings 13 and 19 will move therewith. Moreover, by reason of the large size of rings 13 and 19 the supplemental plates 12 and 16 will always be disposed by gravity at the bottom of the chain 6. The supplemental marker plate shown in Figs. 10 and 11 including the plate 16, double hook 17, and ring 19 may be sold as a unit to be attached to any of the modifications shown in the present case or in my aforesaid patents and applications.

I do not limit my invention to the exact forms shown in the drawings, for obviously changes may be made therein within the scope of the claims.

I claim:

1. In a neck marker for livestock, a pliable strap of rectangular cross-section adapted to be placed upon the top of the neck of a livestock with its ends terminating at the sides of the neck; a pair of plates secured by rivets adjacent the respective ends of the strap and having perforations adjacent their lower ends registering with perforations adjacent the ends of the strap; a chain adapted to underlie the neck of the livestock and having one end engaged with a perforation in one of the plates and related end of the strap; and means for securing the free end of the chain in the perforation of the other plate and in the perforation in the related end of the strap.

2. A neck marker for livestock, comprising a pliable strap of rectangular cross-section adapted to be placed upon the top of the neck of a livestock with its ends terminating at the sides of the neck; a pair of indicia plates each bearing indicia secured by rivets to the respective ends of the strap and having perforations adjacent their lower ends; a chain adapted to underlie the neck of the livestock; one end of the chain being secured in said perforation of one of said plates; the other plate carrying a securing member engaging the perforation in the other plate, said strap having spaced perforations at each end, one perforation receiving said rivet, and the other perforation having an eyelet therein registering with the said chain receiving perforation in the plate.

WILLIAM F. SCHACHT.

REFERENCES CITED

The following references are of record in the file of this patent:

UNITED STATES PATENTS

| Number | Name | Date |
|---|---|---|
| 67,661 | Locke | Aug. 13, 1867 |
| 316,773 | Goodwin | Apr. 28, 1885 |
| 1,025,557 | Anderson | May 7, 1912 |
| 1,169,999 | Richards | Feb. 1, 1916 |
| 1,371,925 | Morgenthaler | Mar. 15, 1921 |
| 1,456,706 | Murray | May 29, 1923 |
| 1,906,073 | McCarty | Apr. 25, 1933 |
| 2,346,946 | Schacht | Apr. 18, 1944 |
| 2,354,617 | Schacht | July 25, 1944 |
| 2,440,023 | Schacht | Apr. 20, 1948 |
| 2,461,777 | Schacht | Feb. 15, 1949 |